UNITED STATES PATENT OFFICE.

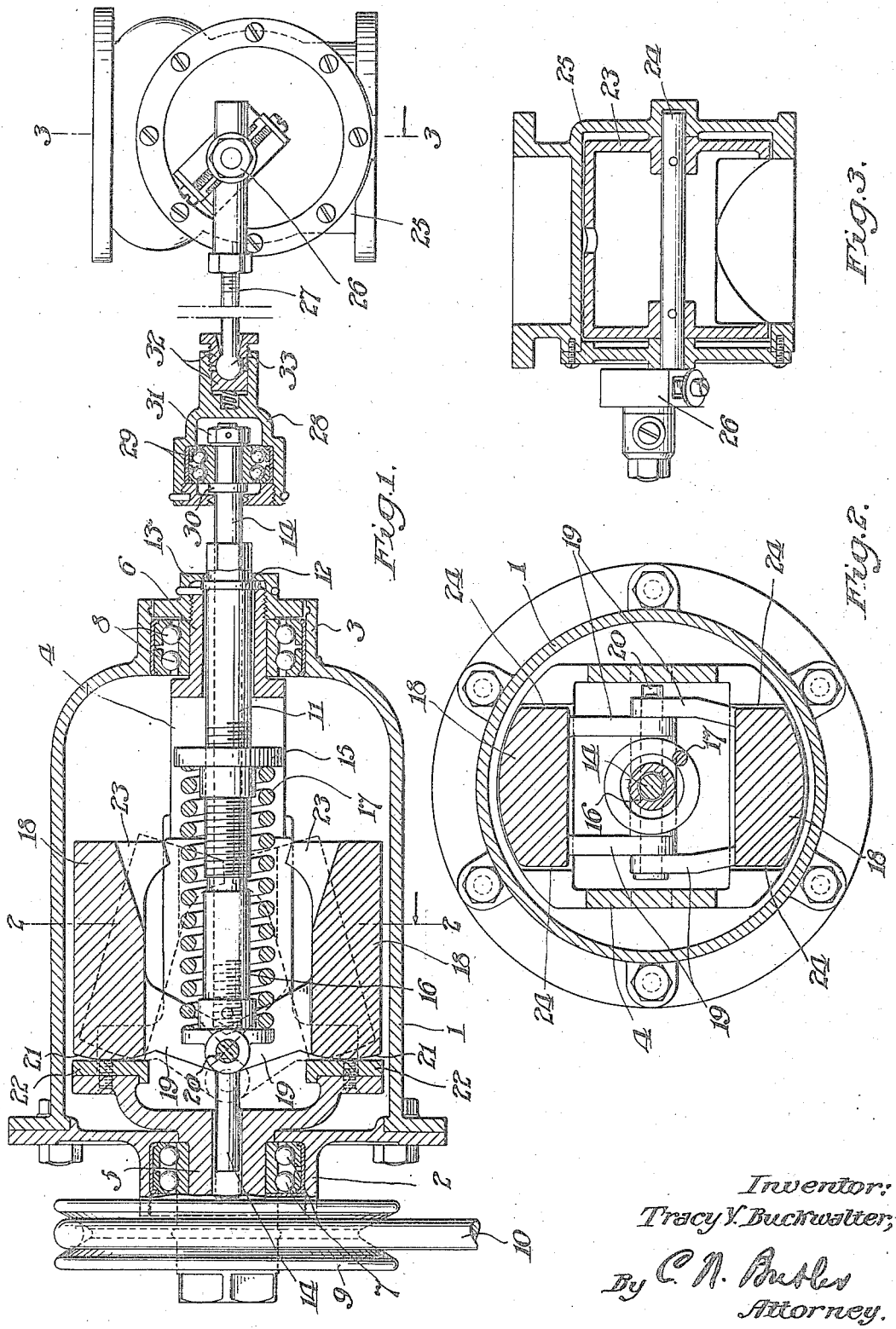

TRACY V. BUCKWALTER, OF ALTOONA, PENNSYLVANIA.

SPEED-GOVERNOR.

1,228,402.  Specification of Letters Patent.  Patented June 5, 1917.

Application filed June 24, 1916. Serial No. 105,638.

*To all whom it may concern:*

Be it known that I, TRACY V. BUCKWALTER, a citizen of the United States, residing at Altoona, in the county of Blair and State of Pennsylvania, have invented certain Improvements in Speed-Governors, of which the following is a specification.

This invention is an improved speed governor having as its primary object the correction of the undesirable eccentric actions of usual speed governors, and the maintenance of a substantially uniform simple proportionate relation between the speed of revolution of the governor weights and the movements of the spring which acts counter to said weights.

In usual speed governors, the weights turn on fulcrums having fixed distances from the axis of a rotating member whose changes in speed effect a change in the force exerted by the weights, which is substantially proportionate to the centrifugal force or the square of the velocity, while the spring which acts against the weights exerts a force in substantially simple proportionate relation to its movement, so that there is an undesirable irregularity in the resulting action, particulary where usual speeds are exceeded.

The correct relation between the counteracting forces exerted by the weights and spring are provided by my invention, which contemplates, in its preferred embodiment, the use of means for varying the distance between the fulcrums of the weights and their axis of revolution so that the longitudinal movement induced by the oscillating weights will be in simple ratio to the speed of revolution.

In the accompanying drawings, Figure 1 is a part sectional, longitudinal view of mechanism embodying my invention; Fig. 2 is a transverse sectional view of the same taken on the line 2—2 of Fig. 1; and Fig. 3 is a transverse sectional view taken on the line 3—3 of Fig. 1.

My invention, in the form thereof illustrated in the drawings, comprises a case 1 provided with the end bearings 2 and 3, the yoke 4 provided with end journals 5 and 6 disposed in the respective bearings 2 and 3, anti-friction bearings 7 disposed between the parts 2 and 5, anti-friction bearings 8 disposed between the parts 3 and 6, and a pulley 9 fixed on the journal 5 and driven by a belt 10, which is driven in any suitable manner, as by the crank shaft of a gas engine.

A hollow shaft 11 passes through the journal 6 and is provided with a flange 12 which is engaged between the outer end of the journal and a cap 13 screwed thereon, the cap serving to retain the bearings 8. A shaft 14 is movable longitudinally in the journal 5 and the shaft 11.

A collar or flanged sleeve 15 is screwed on the shaft 11 within the yoke 4, a flanged sleeve 16 is fixed on the rod 14 within the yoke, and a coiled spring 17, surrounding the shafts, engages the flanges of the sleeves.

Weights 18 are provided with arms 19, which are journaled on the pintles 20 fixed to the sleeve 16, and with curved bearings 21 which engage the bearings 22 on the yoke. The weights have the bifurcations 23 adapted to pass over the spring so that they can move far inwardly at low speeds, whereby compactness of structure is obtained, and the yoke has the bearings 24 which guide the oscillating movements of the weights.

As the yoke 4 is revolved and the weights 18 move outwardly, the weight bearings 21 roll on the yoke bearings 22 to shift the fulcrums of the weights' levers, tending to compress the spring 17 so that the pressure exerted upon the spring is proportional to the speed of revolution, instead of the square of the speed of revolution. Consequently the shaft 14 will be moved in simple proportionate relation to the speed changes.

The longitudinal movement of the shaft 14, by the spring 17 and weights 18, is applicable to the regulation of a gas engine valve 23, which is fixed on the journaled shaft 24 and is oscillated in a case 25 by a crank 26 and a shaft 27 connected therewith. The shafts 14 and 27 are connected by a coupling 28 containing ball bearings 29 held between the flange 30 and nut 31 on the shaft 14, the coupling also containing the spherical socket 32 engaging the ball 33 on the shaft 27.

Having described my invention, I claim:

1. A centrifugal governor comprising a revoluble yoke having bearings concentric with and bearings transverse to its axis of revolution, a shaft movable longitudinally in said concentric bearings, weights having turning connections with said shaft and curved bearings adapted to roll on said bearings second named to vary the distances between their fulcrums and said axis, and a spring disposed between said bearings first named for resisting the outward movements of said weights.

2. A centrifugal governor comprising a case provided with bearings, a yoke having journals revoluble in said bearings and a bearing extending laterally from its axis of revolution, a shaft movable longitudinally in said journals, a weight having a pivotal connection with said shaft and a curved bearing adapted to roll radially to said axis on said bearing, and a spring disposed between said journals for resisting the outward movement of said yoke.

3. A centrifugal governor comprising a revoluble yoke having bearings transverse to its axis of revolution, a shaft movable longitudinally in said yoke, a coiled spring through which said shaft passes, and weights having pivotal connections with said shaft, rolling connections movable radially on said bearings and bifurcations adapted for straddling said spring.

4. A centrifugal governor comprising a housing having alined bearings, a yoke having journals revoluble in said bearings, means for rotating said yoke, a shaft movable longitudinally in said journals, bifurcated weights pivotally connected to said shaft and having rolling bearings movable radially on said yoke, and a spring acting on said shaft counter to said weights in swinging therefrom.

In testimony whereof I have hereunto set my name this 20th day of June, 1916.

TRACY V. BUCKWALTER.